US007040413B2

(12) United States Patent
Mueller et al.

(10) Patent No.: US 7,040,413 B2
(45) Date of Patent: May 9, 2006

(54) HAND POWER TOOL WITH A PNEUMATIC STRIKING MECHANISM

(75) Inventors: Frank Mueller, Deckenpfronn (DE); Gerhard Meixner, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/432,853

(22) PCT Filed: Nov. 14, 2002

(86) PCT No.: PCT/DE02/04228

§ 371 (c)(1),
(2), (4) Date: May 28, 2003

(87) PCT Pub. No.: WO03/045636

PCT Pub. Date: Jun. 5, 2003

(65) Prior Publication Data

US 2004/0016558 A1 Jan. 29, 2004

(30) Foreign Application Priority Data

Nov. 16, 2001 (DE) ................................ 101 56 388

(51) Int. Cl.
*B23Q 5/00* (2006.01)

(52) U.S. Cl. ......................................... 173/13; 173/141

(58) Field of Classification Search .................. 173/13, 173/48, 109, 122, 200, 201, 211, 212, DIG. 2, 173/210, 141
See application file for complete search history.

(56) References Cited

U.S. PATENT DOCUMENTS

| | | | | |
|---|---|---|---|---|
| 4,349,074 | A * | 9/1982 | Ince | 173/48 |
| 4,657,088 | A * | 4/1987 | Grossmann et al. | 173/13 |
| 4,683,960 | A * | 8/1987 | Kostylev et al. | 173/91 |
| 4,932,479 | A * | 6/1990 | Pyatov | 173/14 |
| 5,050,687 | A * | 9/1991 | Prokhorov et al. | 173/133 |
| 5,111,890 | A * | 5/1992 | Ranger et al. | 173/104 |
| 5,244,521 | A * | 9/1993 | Ligman | 156/85 |
| 5,975,217 | A * | 11/1999 | Frenzel et al. | 173/201 |
| 6,431,290 | B1 * | 8/2002 | Muhr et al. | 173/201 |

FOREIGN PATENT DOCUMENTS

| | | |
|---|---|---|
| DE | 80 15 639 U | 9/1980 |
| DE | 197 24 531 A1 | 12/1998 |
| EP | 0 876 880 A | 11/1998 |
| EP | 0 884 138 A | 12/1998 |

* cited by examiner

*Primary Examiner*—Rinaldi I. Rada
*Assistant Examiner*—Nathaniel Chukwurah
(74) *Attorney, Agent, or Firm*—Michael J. Striker

(57) ABSTRACT

The striking mechanism has a hammer barrel (3), which has at least one control opening (23) through which, in an idle position, the air can escape from the hammer barrel (3), and which in a striking position is closed by a covering (25) that prevents the escape of air. To achieve the greatest possible sealing off of the at least one control opening (23) and thus high efficiency of the striking mechanism, the covering (25) is molded from an elastomer.

6 Claims, 2 Drawing Sheets

HAND POWER TOOL WITH A PNEUMATIC STRIKING MECHANISM

BACKGROUND OF THE INVENTION

The present invention relates to a hand power tool—preferably a drill hammer or jackhammer—with a pneumatic striking mechanism that has a hammer barrel which has at least one control opening, through which, in an idle position, air can escape from the hammer barrel and which is closed, in a striking position, by a covering preventing the escape of air.

A hand power tool of this kind with a pneumatic striking mechanism is known, for instance from German Patent Disclosure DE 197 24 531 A1. In the drill hammer or jackhammer described in this reference, an axially displaceably supported hammer barrel is disposed in the power tool housing. An axially reciprocating piston is accommodated in the hammer barrel and is coupled with a striker via an air cushion. A restoring spring, with a restoring force, urges the hammer barrel in the direction of an outset position, in which the air cushion space in the hammer barrel is ventilated via a control opening, so that the striking mechanism of the drill hammer or jackhammer switches to idle, and axial impacts are no longer exerted on a tool. If the hammer barrel is pressed out of this position into the interior of the tool by placement of the tool against a machining point counter to the prestressing of the restoring spring, then the control opening is closed, and the striking mechanism moves to its striking position. As is quite usual for drill hammers or jackhammers, a control sleeve of steel, supported in the power tool housing and closely surrounding the hammer barrel, serves as a covering of the control opening in the striking position of the hammer barrel, and in the striking position, the hammer barrel is thrust under this control sleeve, and the control opening in the hammer barrel is thus covered and closed off from the escape of air. With this kind of control sleeve, the control opening can be closed only inadequately, since there is always a certain sealing gap between the steel control sleeve and the hammer barrel. Thus even in the aspiration phase of the piston, only a limited negative pressure can be built up in the hammer barrel. The efficiency of the striking mechanism suffers as a result. The object of the invention now is to disclose a hand power tool with a pneumatic striking mechanism of the type defined at the outset, whose efficiency is as high as possible.

SUMMARY OF THE INVENTION

The object stated above is attained with the characteristics of claim 1, in that the covering for the at least one control opening in the hammer barrel comprises an elastomer. With this kind of covering, a sealing gap that is deleterious to the generation of the negative pressure in the hammer barrel is avoided, and the efficiency of the striking mechanism is thus increased. Moreover, this kind of covering comprising elastomer has advantages in terms of production over a steel control sleeve.

Advantageous embodiments and refinements of the invention are defined by the dependent claims. The hammer barrel can be supported displaceably in the direction of its longitudinal axis in the power tool housing. Then the covering is advantageously disposed in the power tool housing, nondisplaceably in the axial direction, in such a way that upon an axial displacement into the striking position, the hammer barrel moves with its at least one control opening to beneath the covering.

In another advantageous feature, a retaining means, supported displaceably in the axial direction, for the covering is disposed in the power tool housing, and means are present which at the transition from the idle position to the striking position displace the retaining means along with the covering axially, so that the covering comes to rest above the at least one control opening in the hammer barrel. Advantageously, the means comprise a snap head die, which is supported in the hammer barrel and is displaced against a machining point by a tool introduced into the hammer barrel displaces against a machining point when the tool is pressed upon, and which has a stop that transmits the axial motion of the snap head die to the retaining means of the covering. The stop can be a disk, which is placed on the snap head die and which protrudes with one or more arms through an opening in the hammer barrel as far as the retaining means surrounding the hammer barrel.

It is expedient that the retaining means for the covering is embodied such that it enables play of the covering in the radial direction relative to the hammer barrel.

Preferably, the covering is a control sleeve surrounding the hammer barrel.

BRIEF DESCRIPTION OF THE DRAWINGS

The invention will be described in further detail below in terms of two exemplary embodiments shown in the drawing. Shown are.

DETAILED DESCRIPTION OF THE PREFERRED EMBODIMENTS

Figure 1:
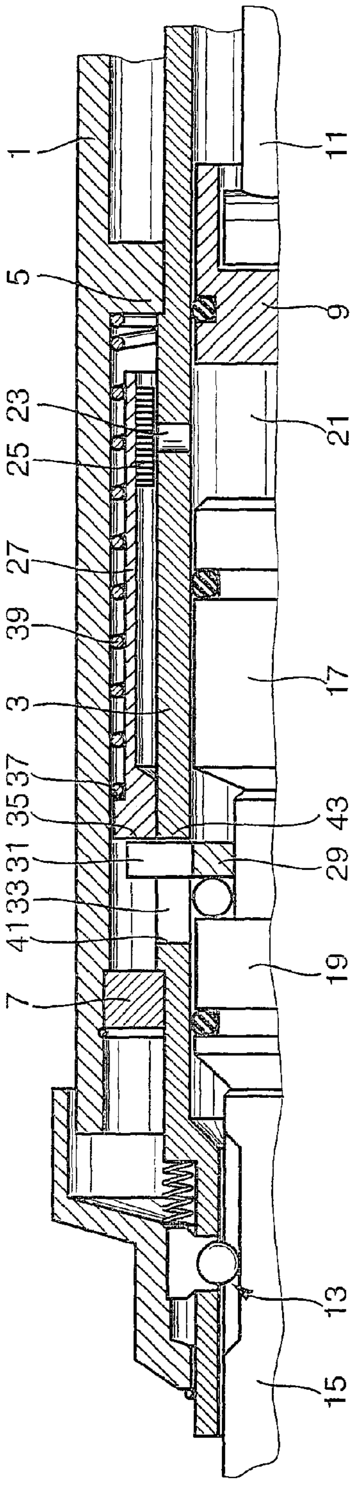
FIG. 1, a fragmentary longitudinal section through a drill hammer striking mechanism in a first embodiment, in the striking position.
Figure 2:
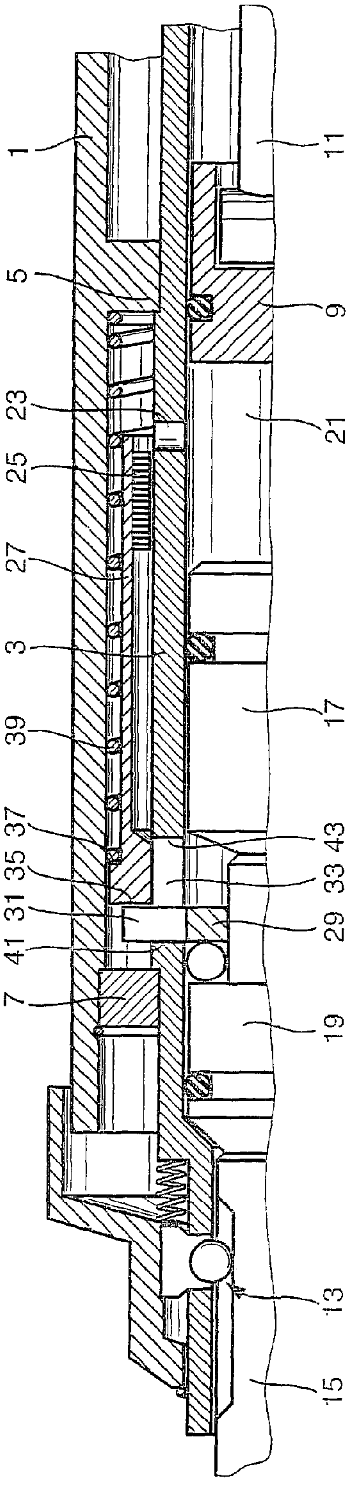
FIG. 2, a fragmentary longitudinal section through the same striking mechanism in the idle position.

FIGS. 1 and 2 show a fragmentary longitudinal section through the striking mechanism of a drill hammer; the striking mechanism is shown in FIG. 1 in the striking position and in FIG. 2 in the idle position. The striking mechanism of this drill hammer has the following construction:

A hammer barrel 3 is rotatably supported in the power tool housing 1. Two bearing points 5 and 7 are located on the inner wall of the power tool housing 1; the bearing point 5, for instance, is an annular collar protruding integrally inward from the power tool housing 1, and the bearing point 7 is a bearing ring retained in the power tool housing 1. With its bearing points 5 and 7, the hammer barrel 3 forms a stop, so that it is not displaceable in the direction of its longitudinal axis.

A piston 9 is accommodated in the hammer barrel 3 and can be driven to reciprocate axially via a connecting rod 11. On its end remote from the piston 9, the hammer barrel 3 is provided with a tool receptacle 13, into which a tool 15 with its shaft is inserted. Between the tool 15 and the piston 9, a striker 17 and a snap head die 19 are disposed axially displaceably in the hammer barrel 3 in a known manner. Via an air cushion, formed in the space 21 between the piston 9 and the striker 17, the striker 17 can be accelerated in the direction of the tool 15; percussive energy is transmitted to the tool 15 via the snap head die 19 by impact transmission.

In the wall of the hammer barrel 3, specifically in the region of the air cushion space 21, there is at least one control opening 23. In the event that the control opening 23 is not closed, an air cushion cannot be built up in the space 21 between the piston 9 and the striker 17. Then the striker 17 cannot be put into an axial motion by the piston 9, either, and accordingly no percussive energy is transmitted to the tool 15, either. This is called the idle position of the striking mechanism. Only when the control opening 23 is closed can an air cushion be built up in the space 21 between the piston 9 and the striker 27, so that percussive energy is then transmitted to the tool 15. The striking mechanism is accordingly now in the striking position.

For the opening and closure of the control opening 23, that is, for the alternation between the idle position and the striking position, a covering is provided, in the form of a control sleeve 25 surrounding the hammer barrel 3. This control sleeve 25 comprises an elastomer, and its inside diameter is designed to be somewhat less than the outside diameter of the hammer barrel 3. The control sleeve 25 therefore conforms quite closely to the hammer barrel 3, so that there is no sealing gap between the control sleeve 25 and the hammer barrel 3 through which air from outside can penetrate the air cushion space 21 in the aspiration phase of the piston 9, or through which air is expelled from the air cushion space 21, for instance in the thrusting phase of the piston 9. The result is very high efficiency of the striking mechanism.

The control sleeve 25 of elastomer is supported displaceably in the direction of the longitudinal axis of the hammer barrel 3 by means of a retaining means 27. This retaining means 27 can for instance be embodied as a sleeve that is seated on the hammer barrel 3 and is displaceable axially on it, and on whose inner wall the control sleeve 25 is fixed. The elastomer control sleeve 25 can be sprayed on as a two-component part, for instance onto the inner wall of the retaining means 27, or snapped into place as a part that has been molded in its final form. The retaining means 27 for the control sleeve 25 is conceived of, by means of the shaping and/or the selection of material, such that on the one hand it lends adequate shape stability to the elastomer control sleeve 25, and on the other, the control sleeve 25 makes a play possible in the radial direction relative to the hammer barrel 3.

A disk 29 is placed on the snap head die 19 and protrudes with one or more arms 31 through an opening 33 out of the hammer barrel 3, as far as the retaining means 17 surrounding the hammer barrel 3. A stop 35, which rests on the at least arm 31 of the disk 29, is located on the retaining means 27. The retaining means 27, along with its stop 35, is pressed by a compression spring 39 against the arm or arms 31 of the disk 29. The compression spring 39 is braced on one side on the collar 5 on the inside of the power tool housing 1 and on the other on a stop 37 on the outer circumference of the retaining means 27. This compression spring 39 pushes the retaining means 27, with the control sleeve 25 fastened to it, in the direction of the tool 15 that is inserted into the hammer barrel 3. With the retaining means 27, via the disk 29, the snap head die 19 is likewise displaced in the axial direction until it comes to a stop against the tool 15. In this position shown in FIG. 2, which is the idle position, the at least one control opening 23 in the hammer barrel 3 is no longer covered by the control sleeve 25.

When pressure is exerted on the tool 15 against a machining point, this tool slides a certain distance into the interior of the hammer barrel 3 and shifts both the snap head die 19 and at the same time, because of the disk 29, the retaining means 27 in the direction of the piston 9, counter to the compression spring 39. The control sleeve 25, fastened to the retaining means 27, is thrust across the control opening 23, as is shown in FIG. 1. Now the striking mechanism is in the striking position. The displacement travel for the retaining means 27 is predetermined by boundary walls 41 and 43 in the opening 33 of the hammer barrel 3, which act as stops for the at least one arm 31 of the disk 29 seated on the snap head die 19.

Figure 3:
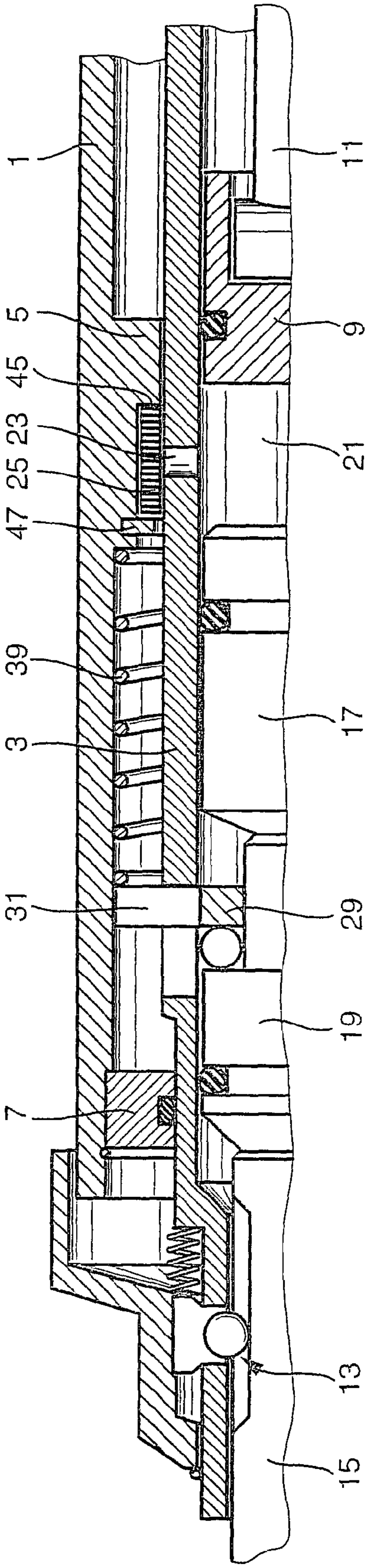
FIG. 3, a fragmentary longitudinal section through a drill hammer striking mechanism in a second embodiment, in the striking position.

The exemplary embodiment of a striking mechanism shown in FIG. 3 differs from the exemplary embodiment shown in FIGS. 1 and 2 in that the hammer barrel 3 is supported displaceably in the axial direction, while no axial displacement is contemplated for the control sleeve 25. In the striking mechanism of FIG. 3, all the parts that occur in the exemplary embodiment shown in FIGS. 1 and 2 are identified again by the same reference numerals.

The control sleeve 25 formed of elastomer, which closely surrounds the hammer barrel 3, is fixed in the axial and radial directions on the inside of the power tool housing 1. In the axial direction, the control sleeve 25 is secured by a stop 45 on the collar 5 of the power tool housing 1 and on the other by a securing ring 47 inserted into the power tool housing 1. In this exemplary embodiment, the compression spring 39 is braced on the collar 5 and on the at least one arm 31 of the disk 29 placed on the snap head die 19.

The compression spring 39, by the pressure on the disk 29, displaces the hammer barrel 3 in the direction of the tool 15. As a result, the at least one control opening 23 of the hammer barrel 3 slides underneath the control sleeve 25, and the air from the air cushion space 21 can escape to the outside through the unclosed control opening 23. The striking mechanism is thus in its idle position.

If, when it is pressed upon, the tool 25 moves toward a machining point in the direction of the snap head die 19, then with the snap head die 19, via the disk 29 connected by nonpositive engagement to the hammer barrel 3, the hammer barrel 3 is displaced counter to the contact pressure of the compression spring 39, and the at least one control opening 23 moves beneath the control sleeve 25. In this position, which is the striking position, the control opening 23 is sealed off from the escape or entry of air from or into the air cushion space 21. This striking position is shown in FIG. 3.

The invention claimed is:

1. A hand power tool in the form of a striking mechanism, comprising:

a pneumatic striking mechanism that has a hammer barrel (3), wherein said hammer barrel has at least one control opening (23), wherein air can escape from the hammer barrel (3) through the at least one control opening (23) and wherein said at least one control opening (23) is closed, in a striking position by a covering (25) preventing the escape of air, wherein the covering (25) comprises an elastomer, and wherein the hammer barrel (3) has a longitudinal axis, and wherein the hammer barrel is supported to be displaceable in the direction of the longitudinal axis in the power tool housing (1), and wherein the covering (25) is disposed to be nondisplaceable in an axial direction in the power tool housing (1), such that the hammer barrel (3) upon an axial displacement into the striking position moves with the at least one control opening (23) to beneath the covering (25).

2. The hand power tool of claim 1, wherein a retaining means (27), supported to be displaceable in the axial direction, for the covering (25) is disposed in the power tool housing (1), and further comprising a means (19, 29, 31) for displacing the retaining means (27) along with the covering (25) axially disposed at a transition from the idle position to the striking position, whereby the covering (25) comes to rest above the at least one control opening (23) in the hammer barrel (3).

3. The hand power tool of claim 2, wherein the means for displacing the retaining means and cover comprise a snap head die (19), wherein the snap head die (19) is supported in the hammer barrel (3) and is displaced against a machining point by a tool (15) introduced into the hammer barrel (3) when the tool (15) is pressed upon, and wherein the snap head die (19) has a stop (29, 31) that transmits an axial motion of the snap head die (19) to the retaining means (27).

4. The hand power tool of claim 3, wherein the stop is a disk (29), wherein said disk is placed on the snap head die (19) and protrudes with at least one arm (31) through an opening (33) in the hammer barrel (3) as far as the retaining means (27) surrounding the hammer barrel (3).

5. The hand power tool of claim 2, wherein the retaining means (27) for the covering (25) is embodied such that the retaining means enables play of the covering (25) in the radial direction relative to the hammer barrel (3).

6. The hand power tool of claim 1, wherein the covering is a control sleeve (25) surrounding the hammer barrel (3).

* * * * *